Dec. 11, 1956  J. D'A. CLARK  2,773,790
HARD MOLDED BOARD
Original Filed March 23, 1953

INVENTOR:
James d'A. Clark,
BY
ATTORNEYS.

United States Patent Office 2,773,790
Patented Dec. 11, 1956

2,773,790

HARD MOLDED BOARD

James D'A. Clark, Longview, Wash., assignor to Changewood Corporation, Chicago, Ill., a corporation of Illinois Application September 2, 1955, Serial No. 532,146

9 Claims. (Cl. 154—45.9)

This invention relates to fibrous materials in the form of wafers or the like for use in the manufacture of fibrous molded products and other products prepared of same.

This is a continuation of my copending application Ser. No. 344,088, filed March 23, 1953, entitled "Hard Molded Board," now abandoned, and which is a continuation-in-part of my copending application Ser. No. 229,375, filed June 3, 1951, now abandoned.

In the manufacture of molded products of crosscut woody wafers having tapered ends, it is desirable to employ a dry process wherein the resinous binder is introduced in powdered form. From the standpoint of economy, it is desirable to achieve as high strength and low water absorption as possible with minimum amount of resinous binder but without introducing undesirable characteristics such as delamination or zones of weakness.

It is an object of this invention to produce woody wafers of the type described embodying characteristics which permit dry molding into a composite structure having relatively low water absorption and high strength with minimum amount of resinous binder and it is a related object to produce a new and improved product molded thereof.

More specifically, it is an object to produce a crosscut woody wafer contoured with respect to thickness, width and length and with a taper in the end portions and to produce a molded product thereof characterized by high strength and integrity with minimum amount of added resinous binder.

These and other objects and advantages of this invention will hereinafter appear and for purposes of illustration, but not of limitation, embodiments are shown in the accompanying drawing in which.

Figure 1:
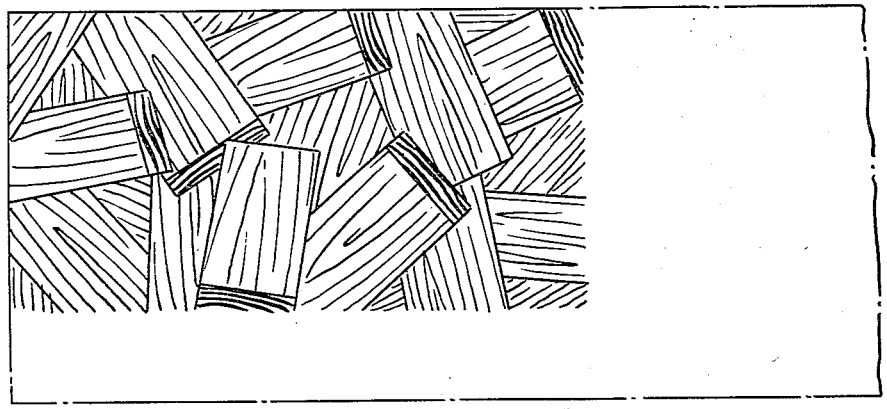
Figure 1 is a top plan view of a board embodying features of this invention molded of crosscut woody wafers with tapered ends.
Figure 2:
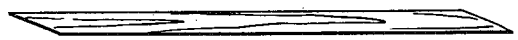
Figure 2 is a sectional elevational view taken through the length of a woody wafer of the type employed in the manufacture of the board shown in Figure 1.
Figure 3:
Figure 3 is a sectional elevational view across the width of the wafer shown in Figure 2.
Figure 4:
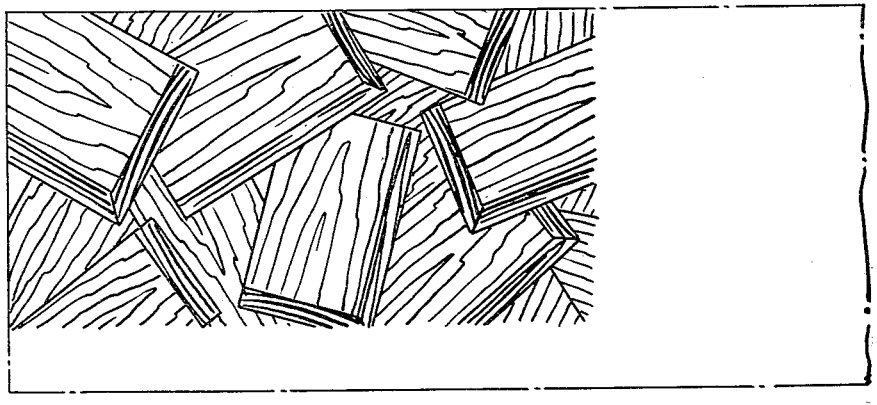
Figure 4 is a top plan view of a product embodying features of this invention molded of crosscut woody wafers tapered both in the end sections and in the side sections.
Figure 5:
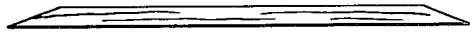
Figure 5 is a sectional elevational view taken lengthwise through the wafer used in manufacture of the board shown in Figure 4.
Figure 6:
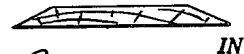
Figure 6 is a sectional elevational view taken crosswise of the wafer.

Wafers which have heretofore been produced in accordance with the invention described in my copending application Ser. No. 344,089 have been limited to thicknesses ranging from 0.002 to 0.015 inch for use in the manufacture of molded products such as board and the like having relatively few, if any, zones of weakness. For satisfactory molding with wafers of the type heretofore produced, for strong dense boards it was necessary to make use of as much as 3 perment by weight resinoous binder in powder form or the like.

It has now been found that marked improvement in strength properties of the molded product can be secured when wafers having substantially greater thickness, preferably in the range of 0.020 to 0.040 inch, are used. The desired improvement in strength properties without increase of resin content can be achieved when the thickness of the wafers is as low as 0.015 inch. Thicknesses greater than 0.040 inch may be used but then it is advisable to employ fibers doubly tapered, that is, fibers which are tapered not only in their end section but also in their side section. In any event, it is not desirable to use wafers having thicknesses much greater than 0.065 inch nor any greater than 5 inches in length or width to prepare boards by normal felting procedures, unless relatively thick boards are produced, such for example as a board having a thickness greater than ⅜ inch, in which event wafers of greater thickness may be employed, such for example as up to about ⅛ inch in thickness.

The improvement resulting from the use of thicker fibers is illustrated in Table I, wherein comparison is made of boards molded of wafers of uniform length crosscut from green Douglas fir but differing in thickness and treated with about 1½ percent phenol formaldehyde resinous binder in powder form and 2 percent wax size. In each instance the wafers were molded into board of corresponding thickness under pressures of 500 pounds per square inch for 8 minutes at 310° F. For comparison, the test results, given below, were extrapolated so as to be based on the boards having a uniform density of 1.00.

TABLE I

| Character of Wafer | | | Percent Resin | Modulus of Rupture, p. s. i. | Water absorption in percentage after 120 hours immersion |
|---|---|---|---|---|---|
| Wafer End | Average Width | Average Thickness | | | |
| Blunt | ⅜ | .008 | 1½ | 4,850 | 72 |
| Taper | ⅜ | .016 | 1½ | 6,100 | 58 |
| Taper | 1 | .021 | 1½ | 7,900 | 47 |

The increased strength and moisture resistance achieved by the use of fibers having tapered ends and thicknesses within the range described corresponds to that which can be secured with about twice the amount of resinous binder when incorporated with fibers of the type which have heretofore been produced and dry molded into boards of the type described.

It has also been found that, in addition to the above, improved characteristics are secured in a molded product when the wafers of which it is formed are characterized by greater width. This is illustrated by the results in Table II which compares board molded under the conditions previously described with 1½ percent by weight of resinous binder and 2 percent of wax.

TABLE II

| Character of Wafers | | | Percent Resin | Modulus of Rupture, p. s. i. | Water absorption in percentage after 120 hours immersion |
|---|---|---|---|---|---|
| Wafer End | Average Width | Average Thickness | | | |
| Blunt | ⅜ | .008 | 1½ | 4,850 | 72 |
| Blunt | 1 | .0205 | 1½ | 5,600 | 52 |
| Taper | ⅜ | .016 | 1½ | 6,100 | 58 |
| Taper | 1 | .021 | 1½ | 7,900 | 47 |

From the theoretical standpoint, it is believed that the thicker and wider wafers are capable of greater resistance to water penetration and that this characteristic is carried into the molded product to the extent that lower moisture absorption without increased resinous binder content is achieved. The use of wider wafers reduces lineal zones of weakness and reduces the number of edge portions required to be integrated into the molded product with the result that the possibility of side effects is materially lessened. The number of capillaries existing in the board are reduced to lessen the moisture absorption into the board. From the practical standpoint, the use of fibers having increased thickness and to a smaller degree increased width reduces the area of exposed surface that is required to be covered with resinous material for integration with the result that greater advantage can be taken of the natural characteristics of the wood and considerable reduction can be made in the amount of resinous binder introduced. With a lesser percentage of resinous binder, the board product corresponds more to that of the original woody substance of which it was formed and the molded product has less of the characteristics of hardness and brittleness which are introduced by the use of higher percentages of resinous binder.

In the manufacture of molded products of wafers embodying the concepts of this invention, it is desirable to make use of wafers which are as wide as are convenient to use and consistent with efficient manufacture. It is preferred to make use of wafers having substantially uniform dimensional characteristics and from the standpoint of resin requirements it is of particular importance to screen out fines and very narrow fibrous particles. Although the taper of the ends may vary over a relatively wide range, especially if the fiber thickness is less than about 0.040 inch, optimum conditions are secured when the taper is at an angle of about 30 degrees. Fibers having ends which are blunter emphasize lineal zones of weakness, while a much sharper taper increases the area which must be covered by resinous material for proper integration. The above conditions pertain to some degree to the side edges of the fiber when tapered except that on account of the grain of the wood, a much less taper and in some instances no taper is satisfactory for the side edges of the wafers prepared from soft or medium hard woods.

Improvement has been found to result not only from control of the thickness and width of the wafer but of its length as well. An element capable of optimum use in the manufacture of molded products or the like of the type described and embodying features of this invention may be defined as a crosscut wafer having the ends and preferably its edge portions tapered at an acute angle, a thickness ranging from 0.015 to 0.065 inch of 1/5 to 1/25 that of the molded structure formed therewith and a length and width as great as possible consistent with means employed to felt the wafers with the width being at least twice the thickness of the wafer and the length being at least ten times the thickness and preferably at least forty times its thickness, but in any event it is desirable to limit the widths and lengths of the fibers to less than 5 inches and preferably to within the range of 1/2 to 2 inches in length and width. In the molded structure, the wafers lie unoriented with their faces substantially parallel to the faces of the structure and coated substantially over their entire surface with an integrating resinous binder. Excellent molded products are secured with wafers of the type described having a resinous binder introduced in amounts as low as 1/5–1 percent by weight of the final product. Improved strength properties and resistance to water absorption are secured with larger amounts of resinous binder but more than 2 percent is seldom required for boards having a density of approximately 1.0 or more and amounts in excess of 3 to 4 percent is to be avoided because of excessive hardness and brittleness which is introduced. Separation of wafers as to size and screening out of fines or out of size fibers may be achieved by conventional winnowing, screening, or separating systems.

The use of substantially more than 3 percent by weight resinous binder, such as the 10 to 40 percent common in the prior art wherein the resinous binder is applied by way of a paste or liquid composition, is not possible because amounts in excess of 4 percent will cling only with difficulty to the wafers unless their surfaces are undesirably rough. This corresponds to a coverage of about 1½ pounds of resin per 1000 square feet of wafer surface with wafers having a thickness of about 0.025 inch. Further increases in dry resin concentration fails to introduce a proportional increase in strength. For example, doubling the resin concentration from 2 percent to 4 percent increased the strength of the molded board by about 10 percent. Generally it is more accurate to calculate resin concentration with reference to the surface area of the wafers since the amount of resin by weight decreases inversely in proportion with the thickness of the wafers and inversely in proportion to the density of the wood of which they are formed. Under such circumstances the resinous concentration may be defined as including 0.2–2 pounds of resinous binder per 1000 square feet of surface area which is a small fraction of the amount heretofore required to produce molded products of comparable strength although having greater brittleness. If a cubic foot of wood weighed or had a density of $d$ pounds and were sliced into square foot wafers, each having a thickness of $t$ inches, there would be a total of $12/t$ wafers cut from the block and each wafer would have an exposed surface of 2 square feet, neglecting the small exposed surfaces along the edges of the wafers. If $p$ percent of resin were applied to the wafers, the weight of resin applied to the wafers cut from the cubic block of wood would be $dp/100$ pounds, which by definition equals $(r/1000)$ $(2 \times 12/t)$ or $.024\ r/t$ pounds. Thus $p$ equals $2.4\ r/td$ and $r$ equals $ptd/2.4$ where $r$ corresponds to the weight of resin per 1000 square feet of exposed surface area.

Application of the resinous binder to achieve uniform distribution over the surfaces of the fibers may be secured by a number of techniques but it is preferred to apply the powdered resin onto the surface of the wafers as they are tumbled in a rotating drum followed, if desired and if the quantity applied is over about 4 percent by screening or cyclone separation or the like to remove any excess. Application of the resinous binder in powdered form thus may be made directly to the wafers or else, if prepared of waste veneer, to the sheets of veneer in advance of cutting into wafers. The wafers, whether large or small, can be deposited onto a caul sheet or other mold surface by a felting machine or other spreaders for molding by conventional means into a composite product under heat and pressure. In molding, the fibrous layer is usually compressed to about 1/3 to 1/8 its original thickness.

Invention herein is not intended to cover wooden strips or pieces of such dimension as permit individually shaping and manual placement to achieve a specific arrangement and pattern or structures molded with liquid or dry resin even present in quantities intended substantially to fill the voids to provide a dense substantially void-free structure, as in the manufacture of boats or airplane fuselages.

It is preferred to make use of a resinous binder of the thermosetting type such as phenol formaldehyde, urea formaldehyde, melamine formaldehyde and the like and to make use of such binders in dry powder form which clings to the wooden wafers in the desired concentration, but it will be understood that such resinous materials may be used in liquid form and liquids of thermosetting unsaturated polyesters may be used for the manufacture of low pressure molded products. Though not equivalent, it will be understood that other resinous powders, such as shellac, asphalt, or other bitumen, cellulose acetate, and the like in powder form may be used.

It will be further understood that numerous changes may be made in the details of construction, arrangement, and techniques for handling and molding without departing from the spirit of the invention, especially as defined in the following claims.

I claim:

1. A crosscut woody wafer adapted for use in a consolidated structure, said wafer having a thickness within the range of 0.015–0.065 inch in which the fibers are substantially parallel to and extend longitudinally of the wafer and having a length at least ten times the thickness of the wafer but less than 5 inches with the ends of the wafers at an acute angle with the broad faces.

2. A crosscut woody wafer adapted for use in a consolidated structure, said wafer having a thickness within the range of more than 0.015 to about 0.065 inch and in which the fibers are substantially parallel to and extend longitudinally of the wafer having its broad face characterized by freedom of cracks and chips which are characteristic of wafers cut from woody material parallel to and along the fiber and having a length at least ten times the thickness of the wafer but less than 5 inches, and a thermosetting resinous material on the surfaces of the wafers in amounts ranging from ⅓ to 2 pounds per 1000 square feet of surface area.

3. A consolidated structure consisting essentially of a plurality of fibrous elements of the type claimed in claim 1 interfelted and aligned with the broad faces lying substantially in the same plane and a thermosetting resinous binder integrating the wafers one to another into a composite structure.

4. Crosscut woody wafers adapted for use in a consolidated structure, said wafers having a thickness within the range of more than 0.015 to about 0.065 inch and in which the fibers are substantially parallel to and extend longitudinally of the wafer having its broad face characterized by freedom of cracks and chips which are characteristic of wafers cut from woody material parallel to and along the fiber and having a width at least twice the thickness and a length at least ten times the thickness of the wafer but less than 5 inches, and a thermosetting resinous material on the surfaces of the wafers in amounts ranging from ⅓ to 2 pounds per 1000 square feet of surface area.

5. A consolidated structure having a central lamina consisting essentially of a plurality of fibrous elements having a thickness within the range of 0.02–0.04 inch, in which the fiber runs parallel to the broad faces and which has a length ranging from 0.5 to less than 5.0 inches, with the ends of the wafers at an acute angle with the broad faces and with the fibrous elements interfelted and aligned with the broad faces lying substantially in the same plane, and a thermosetting resinous binder integrating the surfaces one to another to form the lamina and in which the resinous binder is present in amounts ranging from 0.2–2.0 pounds per 1000 square feet of surface area of the wafers present in the lamina.

6. A consolidated structure consisting essentially of a plurality of fibrous elements of the type claimed in claim 1 interfelted and aligned with the broad faces lying substantially in the same plane and a thermosetting resinous binder integrating the wafers one to another into a composite hard molded board and present in amounts ranging from ⅓ to 2 pounds per 1,000 square feet of surface area of the fibrous elements of which the board is formed.

7. A crosscut woody wafer adapted for use in a consolidated structure, said wafer having a thickness within the range of about 0.015 to 0.065 inch and in which the fibers are substantially parallel to and extend longitudinally of the wafer having its broad faces characterized by freedom of cracks and chips which are characteristic of wafers cut from woody material parallel to and along the fiber and having a length at least ten times the thickness of the wafer but less than 5 inches, and a thermosetting resinous material on the surfaces of the wafers in amounts ranging from ⅓ to 2 pounds per 1,000 square feet of surface area but not more than 3 percent by weight of the wafer.

8. A consolidated structure having a central lamina consisting essentially of a plurality of fibrous elements having a thickness within the range of 0.02–0.04 inch in which the fibers run parallel to the broad faces and which have a length ranging from 0.5 to less than 5.0 inches, with the ends of the wafers tapered as to thickness and with the fibrous elements interfelted and aligned with the broad faces lying substantially in the same plane, and a thermosetting resinous binder integrating the surfaces one to another to form the lamina and in which the resinous binder is present in an amount ranging from 0.2–2.0 pounds per 1,000 square feet of surface area of the wafers present in the lamina but not more than 3 percent by weight of the lamina.

9. A lamina consisting essentially of a plurality of fibrous elements as claimed in claim 2 interfelted and aligned with the broad faces lying substantially in the same plane and in which the thermosetting resinous binder is present in an amount not more than 3 percent by weight of the lamina.

No references cited.